United States Patent [19]

Miyashita et al.

[11] 3,823,530

[45] July 16, 1974

[54] METHOD AND APPARATUS FOR SEPARATING AND COLLECTING FINE PARTICLES IN GAS WITH STREAM OF FALLING MOLTEN METAL DROPS

[75] Inventors: Tsuneo Miyashita; Leon Michel Chaussy, both of Kawasaki, Japan

[73] Assignee: Nippon Kokan Kabushiki Kaisha, Tokyo, Japan

[22] Filed: Dec. 18, 1972

[21] Appl. No.: 316,003

[30] Foreign Application Priority Data
Dec. 24, 1971 Japan.............................. 46-01730

[52] U.S. Cl............................ 55/72, 55/89, 55/228
[51] Int. Cl........................................... B01d 53/14
[58] Field of Search......................... 55/70–73, 84, 55/85, 89, 228, 229, 90, 233; 423/210.5

[56] References Cited
UNITED STATES PATENTS

| | | | |
|---|---|---|---|
| 3,073,092 | 1/1963 | Ancrum et al. | 55/89 |
| 3,312,525 | 4/1967 | Schmidt et al. | 55/70 |
| 3,318,075 | 5/1967 | Wilson | 55/233 |
| 3,335,548 | 8/1967 | Harmon et al. | 55/90 |
| 3,659,401 | 5/1972 | Giammako | 55/233 |

*Primary Examiner*—Charles N. Hart
*Attorney, Agent, or Firm*—Flynn & Frishauf

[57] ABSTRACT

A method and apparatus for separating fine particles such as soot contained in hot gases, in which the gas is passed upward countercurrently to contact with the descending molten metal drops, whereby fine particles contained in the gas are attached to the falling molten metal drops and are thus separated from the gas.

7 Claims, 2 Drawing Figures

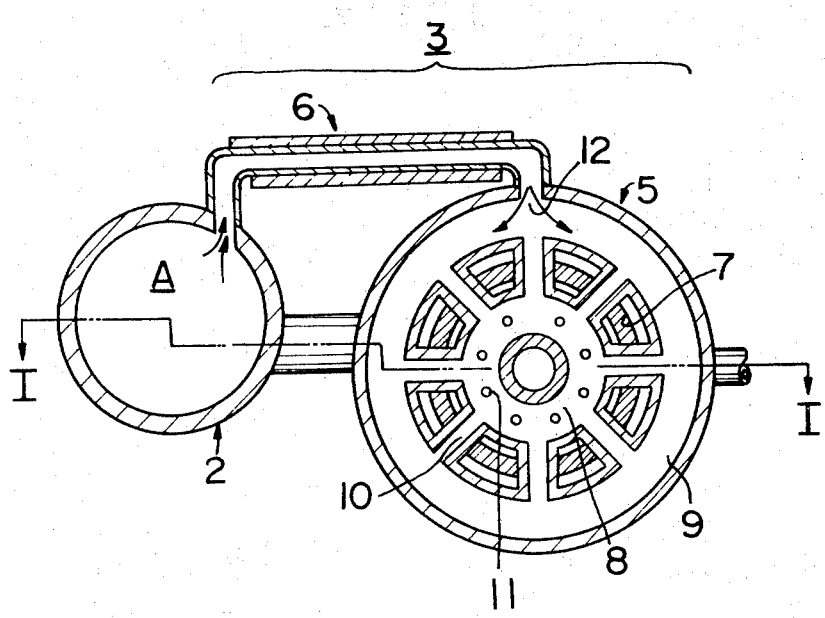

3,823,530

METHOD AND APPARATUS FOR SEPARATING AND COLLECTING FINE PARTICLES IN GAS WITH STREAM OF FALLING MOLTEN METAL DROPS

BACKGROUND OF THE INVENTION

When town gas or synthetic gas is manufactured by using crude oil or naphtha as a material and subjecting it to thermal cracking, or when heavy oil is partially oxidized with oxygen, the gas thus produced contains fine particles such as soot, so that in order to use the gas as town gas, the fine particles in the gas must be separated and removed. When such a gas is used as the town gas or synthetic gas, the gas is cooled and used at room temperatures. Therefore, the fine particles such as soot in the gas can be effectively removed by passing the gas through a water spray tower or washing tower. However, if it is desired to use the gas at the highest temperature possible, for example, when it is used in a reducing furnace for smelting ores, the removal of the fine particles with the use of water inevitably reduces the temperature of the gas to such an extent that the gas must be reheated before it is introduced into the furnace.

When soot and the like contained in a hot gas is to be separated and collected without reducing the temperature of the gas, if the gas is brought into contact with air, the high temperature soot would be burned instantly with the result that not only the soot and the like cannot be collected and used for any useful purposes, but also there will be a considerable waste of energy. Furthermore, it is extremely dangerous to allow such a gas to contact with air.

In the past, there has existed a need for an improved method by which fine particles such as soot contained in hot gases can be separated and removed without cooling the gas and keeping the gas out of contact with air. However, no effective method has been proposed so far.

Therefore, it is an object of the present invention to provide an improved method and apparatus for removal of fine particles such as soot contained in hot gases, whereby the fine particles such as soot can be effectively separated and collected without reducing the gas temperature and keeping the gas out of contact with air.

For a more complete understanding of the nature and scope of the invention, reference may be had by way of example to the following detailed description, taken in conjunction with the accompanying drawings.

BRIEF DESCRIPTION OF THE DRAWINGS

FIG. 2 is a cross-sectional view taken along the line II—II of FIG. 1.

DESCRIPTION OF THE PREFERRED EMBODIMENT

Figure 1:
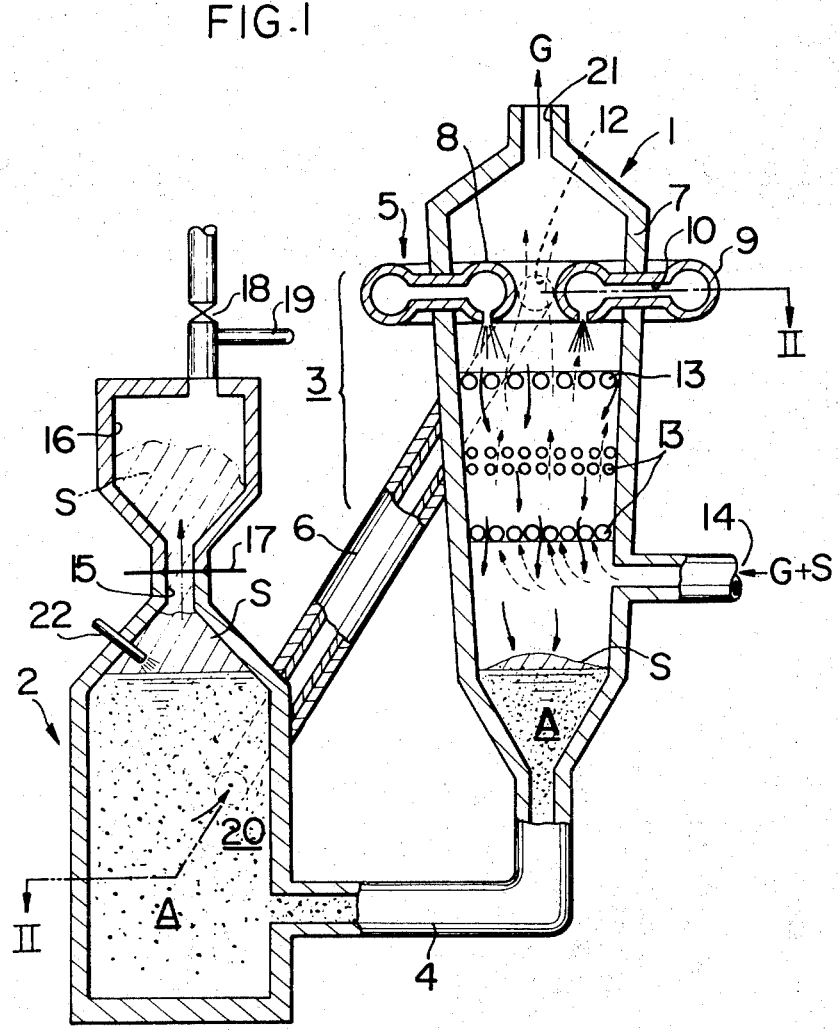
FIG. 1 is a longitudinal sectional view taken along the line I—I of FIG. 2, showing an embodiment of an apparatus according to the present invention.

The apparatus according to the present invention generally comprises, in combination, a soot catching tower 1, a static bath chamber 2 which is connected to the said soot catching tower and in which molten metal injected in drops and which catches fine particles in hot gases, such as soot, remains stationary, and a means 3 consisting of a means 6 through which the molten metal in the static bath chamber is transferred to the upper part of the tower and an annular tube 5 where the molten metal transferred from the chamber is released in drops within the tower.

Referring to FIG. 1, the lower part of the soot catching tower 1 is connected to the static bath chamber 2 through a conduit 4, while the upper part of the soot catching tower 1 is provided with an annular tube 5 and one end of an electromagnetic pump 6 connected to the static bath chamber 2 is opened into the side wall of the annular tube 5. The electromagnetic pump 6 and the annular tube 5 constitute the means 3 for transferring and releasing the molten metal in drops. The annular tube 5 comprises two tube portions 8 and 9 formed on the inside and outside of a tower wall 7 in the upper part of the soot catching tower 1 and a connecting tube portion 10 extending through the tower wall 7 to interconnect the tube portions 8 and 9. The tube portion 8 is formed with a given number of nozzle openings 11 in the lower side thereof, whereby the molten metal (A) introduced from an opening 12 is filled in the tube portions 8 and 9 from which the molten metal is released in drops through the nozzle openings 11. It is to be noted here that the annular tube 5 is not limited to the illustrated form and it may be of any other form and construction provided that the molten metal transferred to the upper part of the soot catching tower 1 can be suitably dispersed and dropped impartially within the tower.

The electromagnetic pump 6 which transfers the molten metal (A) from the static bath chamber 2 to the annular tube 5, is of the type known in the art and thus it will not be explained in more detail. It is shown only schematically in the drawings. While any other transfer means may be used in place of the electromagnetic pump, the electromagnetic pump may be said as best suited for the purposes of the present invention, since the electromagnetic pump comprises a large number of magnets surrounding the tube so that by simply magnetizing the magnets successively, the molten metal (A) can be transferred from one place to the other by utilizing its properties as a metal and thus the electromagnetic pump is simple in operation and reliable in its transferring capacity.

Practically in the middle part of the soot catching tower 1, Raschig rings 13 made of a refractory material are filled in several rows and in this manner gas introduced from a hot gas supply inlet 14 and descending drops of the molten metal are permitted to fully contact with each other. The falling drops of the molten metal (A) accumulate in the lower part of the tower 1 from which the molten metal (A) flows into the static bath chamber 2 under the pressure in the tower.

On the other hand, the opening at the top of the static bath chamber 2 constitutes a soot discharging outlet 15 at which is installed a separating and collecting unit for sooty fine particles in molten metal. In the illustrated embodiment, a container 16 is disposed on the discharging outlet 15 with a vale 17 being placed therebetween. The container 16 is preliminarily filled hermetically with an inert gas such as $N_2$. Numeral 18 designates a safety valve for adjusting the gas pressure in the container 16.

Next, the method for separating and recovering sooty fine particles in the molten metal with the apparatus described above will be explained hereunder.

Initially, hot gas (G + S) produced by cracking or transforming asphalt or heavy oil and containing soot enters the soot catching tower 1 and passes in the directions shown by broken line arrows. In this case, since the molten metal (A) consisting of a low melting metal, such as, lead, zinc, copper or tin which does not chemically react with the soot and the Raschig rings 13, is being injected in drops from the nozzle openings 11 in the annular tube 5 within the tower 1 as shown by the solid line arrows, streams of the hot gas are carried away toward the lower part of the tower while making contact with the falling drops of the molten metal. Then, since the lower end of the tower is directly connected to the static bath chamber 2, the fine particles such as soot float on the surface of the molten metal in the static bath chamber 2. The molten metal in the static bath chamber 2 serves as a gas seal and at the same time the soot contained in the molten metal floats on the surface of the molten metal and thus the soot is separated from the metal. As the level of the molten metal surface rises (in this case, if an inert gas is supplied into the soot catching tower 1 by a suitable means to turn the interior of the tower into a sort of pressurized chamber, the level of the molten metal surface in the static bath chamber 2 can be raised more easily), the sooty fine particles floated and accumulated on the surface of the molten metal are forced up into the container 16 and in this way the sooty fine particles can be securely separated and recovered. The soot (S) in the container 16 can be easily collected by means of a screw conveyor, or by supplying an inert gas from a system 19 to pressurize the container 16.

On the other hand, the molten metal which is to be dropped within the tower 1 from the upper part thereof is drawn by the electromagnetic pump 6 at a location 20 which is satisfactorily beneath the molten metal surface, and the molten metal is then introduced under pressure into the tower from the annular tube 5 in the upper part of the tower 1.

The gas from which the fine particles such as soot have been removed in the manner described above, is now carried to the outside of the tower 1 through an outlet 21 and it is then introduced into a reducing furnace, for example.

Further, while the molten metal in the static bath chamber is maintained in its molten state by the heat supplied as a result of contact between the hot gas and the molten metal drops, the molten metal may be heated by means of an auxiliary burner 22 to maintain or adjust the temperature of the molten metal.

The soot floated on the surface of the molten metal is discharged through the outlet 15 by raising the level of the surface of the molten metal in the bath.

It will thus be seen that according to the present invention, fine particles such as soot contained in the gas can be separated and removed while maintaining the gas at its elevated temperature, or alternately while increasing or adjusting the temperature of the gas. Moreover, since the fine particles such as soot do not chemically react with the molten metal and float on the surface of the molten metal in the static bath chamber, the removed fine particles can be easily recovered and at the same time the bath of molten metal and dropped metals are free from any contamination and thus they can be used for a long period of time.

Furthermore, it is possible to maintain the bath of molten metal and the molten metal drops in molten state by virtue of heat exchange between the hot gas and the molten metal drops. Still furthermore, it is possible to increase or adjust the temperature of the gas by additional use of auxiliary heating.

What we claim is:

1. A method of separating and recovering fine particles in hot gas with a stream of falling molten metal drops, comprising the steps of; passing a hot gas containing fine particles such as soot to countercurrently contact with a stream of falling molten metal drops, removing said fine particles from said hot gas by attaching said fine particles to said molten metal drops and causing said molten metal drops with the fine particles to flow into a static bath of the molten metal, causing said removed soot to float on the surface of the molten metal in said static bath to thereby separate said soot from said molten metal.

2. A method according to claim 1, wherein said molten metal in said static bath is transferred and dropped again to contact with a countercurrent of hot gas, and said process is continued repeatedly.

3. A method according to claim 2, wherein said contact between streams of the molten metal drops and counter-currents of said hot gas is effected while collecting the soot separated on the surface of said static bath by a suitable means.

4. A method according to claim 3, wherein an inert gas is injected to apply pressure and to raise the level of the surface of said static bath, whereby the soot floated and separated on the surface of said static bath is easily collected.

5. A method according to claim 3, wherein the molten metal of said static bath is heated by a burner to adjust the temperature thereof.

6. An apparatus for separating and collecting fine particles contained in a gas with a stream of falling molten metal drops comprising: tower means for contacting a stream of falling molten metal drops with a hot gas countercurrently; a static bath chamber connected to said tower means, having a discharge outlet and being adapted to receive and arrest said molten metal drops falling in said tower and having attached thereto fine particles such as soot contained in said hot gas; a soot collecting container having an inert gas hermetically filled therein coupled to said discharge outlet with a valve means; and means for interconnecting said tower means and said static bath chamber whereby the molten metal in said static bath chamber is transferred to the upper part of said tower means and dropped in said tower.

7. An apparatus according to claim 6, wherein said means for interconnecting said tower means and said static bath chamber and transferring the molten metal to the upper part of said tower means to thereby drop said molten metal in said tower, comprises an annular tube provided in the upper part of said tower, said annular tube including an inner tube portion having a plurality of nozzle openings and an outer tube portion connected to said inner tube portion, and an electromagnetic pump interconnecting said annular tube and said static bath chamber.

* * * * *